United States Patent
Mochida et al.

(10) Patent No.: US 7,655,204 B2
(45) Date of Patent: Feb. 2, 2010

(54) HEAT-TREATED ACTIVE CARBONS FOR USE IN DENITRATION, PROCESSES FOR PRODUCING SAME, DENITRATION METHOD USING SAME, AND DENITRATION SYSTEM USING SAME

(75) Inventors: Isao Mochida, Fukuoka (JP); Akinori Yasutake, Nagasaki (JP); Toshihiko Setoguchi, Nagasaki (JP); Norihisa Kobayashi, Chiyoda-ku (JP); Takahiro Kasuh, Osaka (JP); Masaaki Yoshikawa, Osaka (JP)

(73) Assignee: Mitsubishi Jukogyo Kabushiki Kaisha, Tokyo (JP)

( * ) Notice: Subject to any disclaimer, the term of this patent is extended or adjusted under 35 U.S.C. 154(b) by 9 days.

(21) Appl. No.: 12/292,273

(22) Filed: Nov. 14, 2008

(65) Prior Publication Data

US 2009/0081097 A1 Mar. 26, 2009

Related U.S. Application Data

(62) Division of application No. 10/081,208, filed on Feb. 25, 2002, now Pat. No. 7,465,429, which is a division of application No. 09/637,249, filed on Aug. 14, 2000, now abandoned, which is a division of application No. 08/817,659, filed as application No. PCT/JP96/02737 on Sep. 24, 1996, now Pat. No. 6,127,312.

(30) Foreign Application Priority Data

| Oct. 2, 1995 | (JP) | ............................ 1995-255045 |
| Oct. 2, 1995 | (JP) | ............................ 1995-255047 |
| Nov. 2, 1995 | (JP) | ............................ 1995-285665 |

(51) Int. Cl.
*B01D 53/56* (2006.01)

(52) U.S. Cl. .................................................. 423/239.1

(58) Field of Classification Search ............... 423/239.1
See application file for complete search history.

(56) References Cited

U.S. PATENT DOCUMENTS

| 3,961,020 A | 6/1976 | Seki |
| 4,210,628 A | 7/1980 | Ninomiya et al. |
| 4,256,728 A | 3/1981 | Nishino et al. |
| 4,831,011 A | 5/1989 | Oikawa et al. |
| 4,855,116 A | 8/1989 | Richter et al. |
| 5,172,307 A | 12/1992 | Tabuchi et al. |
| 5,446,005 A | 8/1995 | Endo |
| 5,462,908 A | 10/1995 | Liang et al. |

FOREIGN PATENT DOCUMENTS

| JP | 54-064091 | 5/1979 |
| JP | 60-79176 A | 5/1985 |
| JP | 4-367707 A | 12/1992 |
| JP | 7-47227 A | 2/1995 |
| WO | WO 94/16806 A1 | 8/1994 |

OTHER PUBLICATIONS

Matsumura, "The Effects of Hydrophilic Structures of Active Carbons on the Adsorption of Benzene and Methanol Vapors," Carbon, 1985, 23(3):263-271.

*Primary Examiner*—Stuart Hendrickson
(74) *Attorney, Agent, or Firm*—Foley & Lardner LLP

(57) ABSTRACT

This invention relates to a technique for removing nitrogen oxides ($NO_x$) present in exhaust gases discharged from boilers and the like. When the temperature of the exhaust gas is 100° C. or below, a heat-treated active carbon produced by heat-treating a raw active carbon at 600 to 1,200° C. in a non-oxidizing atmosphere so as to remove oxygen-containing functional groups present at the surfaces thereof and thereby reduce the atomic surface oxygen/surface carbon ratio to 0.05 or less is preferably used. When the temperature of the exhaust gas exceeds 100° C., a heat-treated active carbon produced by heat-treating a raw active carbon at 600 to 1,200° C. in a non-oxidizing atmosphere and activating the surfaces thereof with sulfuric acid or nitric acid to impart oxidizing oxygen-containing functional groups thereto is preferably used.

33 Claims, 7 Drawing Sheets

FIG. 3
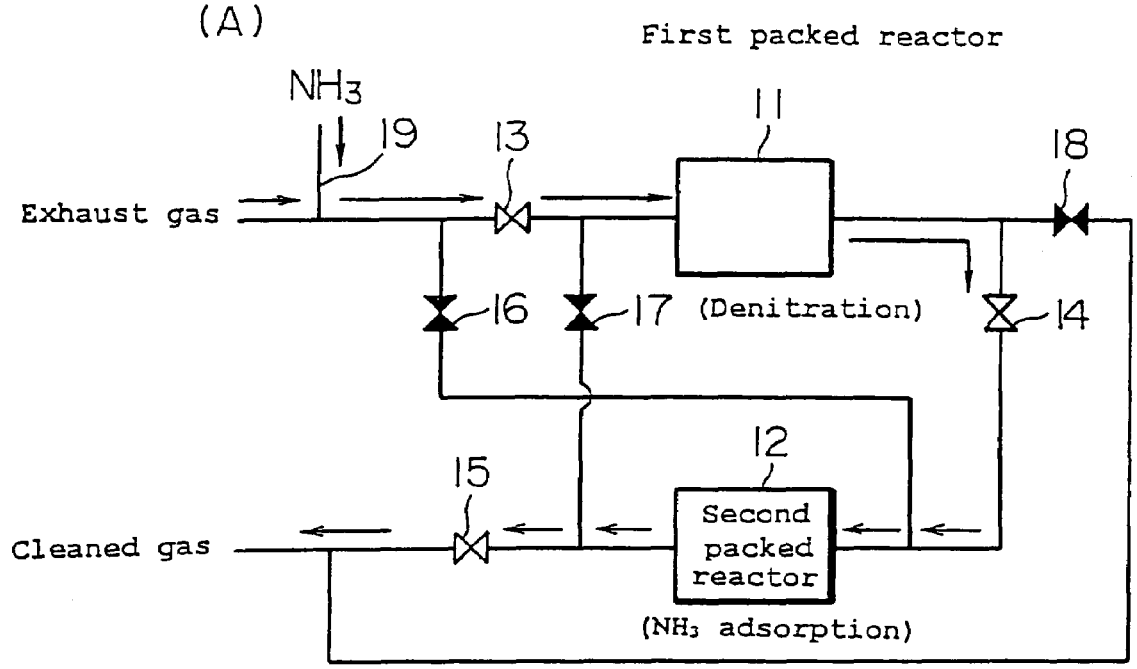
(A)
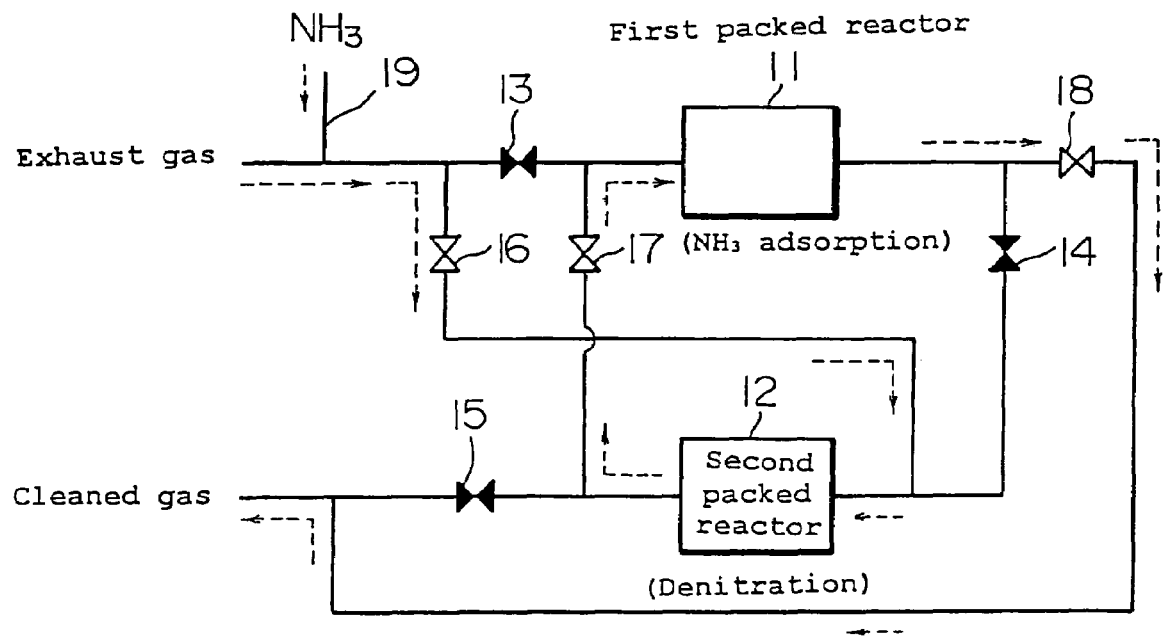
(B)
→ First step
--→ Second step

HEAT-TREATED ACTIVE CARBONS FOR USE IN DENITRATION, PROCESSES FOR PRODUCING SAME, DENITRATION METHOD USING SAME, AND DENITRATION SYSTEM USING SAME

TECHNICAL FIELD

This invention relates to the removal of nitrogen oxides present in combustion exhaust gases discharged from boilers, engines, turbines and the like, and more particularly to an exhaust gas denitration technique in which cold to hot nitrogen oxides can be efficiently reduced and thereby decomposed to nitrogen and water.

This invention is especially suitable for the denitration of cold exhaust gases discharged from the outlets of existing exhaust gas denitration apparatus, boilers and the like.

Moreover, this invention also relates to the removal of nitrogen oxides present in ventilation gases produced in road tunnels, underground parking spaces, street crossings and the like, and more particularly to a low-temperature denitration technique in which nitrogen oxides having a lower concentration (typically about 15 ppm or less) and a low temperature (typically ordinary temperature to about 50° C.) as compared with exhaust gases from boilers and the like can be efficiently reduced and thereby decomposed to nitrogen and water.

Furthermore, this invention also relates to denitration systems using a heat-treated active carbon for the removal of nitrogen oxides ($NO_x$) present in exhaust gases discharged from boilers, gas turbines, engines and combustion furnaces for burning various types of fuel. The present invention can be suitably used for the removal of nitrogen oxides present in tunnels and for the removal of nitrogen oxides present in exhaust gases from nitric acid production plants.

BACKGROUND ART

For the denitration of exhaust gases from stationary nitrogen oxide-producing sources such as boilers, a method for reducing nitrogen oxides selectively by using vanadium oxide as a catalyst and ammonia as a reducing agent (i.e., the SCR method) has conventionally been known and is widely employed for practical purposes ("Techniques and Regulations for the Prevention of Environmental Pollution", Volume on the Atmosphere, p. 130, Maruzen Co., Ltd.). However, in this method using the vanadium oxide catalyst, the temperature of exhaust gas needs to be raised to 300° C. or above in order to achieve a practically sufficient degree of denitration. Consequently, it is necessary to install a denitrator containing a catalyst bed in the high-temperature section of the boiler (e.g., just behind the outlet of the boiler or in the heat transfer section of the boiler), or reheat cold exhaust gas and thereby raise its temperature. However, these techniques involve the following problems.

When the denitrator is installed in the high-temperature section of the boiler, various problems arise in that the overall equipment becomes complicated, the use of a heat-resisting material causes an increase in equipment cost, and workability for replacement of the catalyst bed is reduced. When cold exhaust gas is reheated, an additional heater is required, resulting in an increase in equipment cost.

Accordingly, a first object of the present invention is to provide a technique by which the denitration of exhaust gases from stationary nitrogen oxide-producing sources such as boilers can be performed at low temperatures ranging from ordinary temperature (about 5 to 20° C.) to about 150° C.

On the other hand, exhaust gases from road tunnels and the like are characterized in that they have a much lower NO concentration of about 10 ppm or less as compared with the concentration of nitrogen oxides in exhaust gases from boilers and the like, their temperature is in the vicinity of ordinary temperature, and they are produced in enormous volumes. Consequently, in order to remove denitrate gases from road tunnels and the like according to the conventional SCR method, the temperature of the gases must be raised to 300° C. or above. This requires a huge amount of thermal energy and is unprofitable from an economical point of view.

In Japanese Patent Publication No. 41142/'95, Japanese Patent Provisional Publication No. 47227/'95 and the like, there has been proposed a process in which low-concentration NO at ordinary temperature is oxidized to $NO_2$ with ozone or the like, the resulting $NO_2$ is adsorbed to an adsorbent, and the highly concentrated $NO_2$ is decomposed by treatment with a reducing gas such as ammonia. However, in this process involving an adsorption step, not only the equipment is increased in size and becomes complicated, but also the use of ozone poses a new safety problem. This, it is difficult to put this process to practical use.

Accordingly, a second object of the present invention is provide a technique by which NO present in exhaust gases from road tunnels and the like and hence having a low concentration and a temperature in the vicinity of ordinary temperature can be directly reacted catalytically with ammonia and thereby decomposed to nitrogen and water.

Now, an example of exhaust gas treatment by means of a conventional exhaust gas treating system is explained with reference to FIG. 7.

In FIG. 7, reference numeral 41 designates a boiler; 42, a denitrator; 43, an air preheater; 44, a dust collector; 45, a gas-gas heater; 46, a desulfurizer; and 47, a stack.

As shown in FIG. 7, a denitrator 42 using a catalyst is installed at the outlet of a boiler 41 or the like in order to remove nitrogen oxides ($NO_x$) present in the exhaust gas, and an air preheater 43 is installed at the outlet of denitrator 42 in order to lower the temperature of the exhaust gas to about 130° C.

The exhaust gas having passed through the aforesaid air preheater 43 is dedusted in a dust collector 44, passed through a gas-gas heater 45 and then introduced into a desulfurizer 46 where sulfur oxides ($SO_x$) are removed therefrom. Thereafter, the exhaust gas is discharged into the atmosphere through a stack 47.

As described above, in the current practical process for the removal of nitrogen oxides present in exhaust gas from boilers, there is used a denitrator 42 based on the selective catalytic reduction (SCR) method in which nitrogen oxides are decomposed to nitrogen and water vapor by using a catalyst comprising $V_2O_5$ supported on $TiO_2$ and a reducing agent comprising $NH_3$. However, this process involves the following problems.

First, a reaction temperature of 300 to 400° C. is required because of the performance of the catalyst. Secondly, $NH_3$ is required for use as reducing agent. Thirdly, since the current leak level of $NO_x$ is from 5 to 40 ppm, an excess of $NH_3$ needs to be injected for the purpose of reducing the leak level of $NO_x$ to zero.

Moreover, recent environmental standards demand that the concentration of nitrogen oxides ($NO_x$) in exhaust gases should be reduced to a level of 1 ppm or less which is commonly known as a high-degree denitration level. In the aforesaid conventional denitration treatment based on the selective catalytic reduction (SCR) method, a marked increase in removal cost due to an increased size of equipment and the like is unavoidable, even though the conditions are optimized. On the other hand, it is desired from the viewpoint of environmental problems to improve the efficiency of removal of nitrogen oxides.

Accordingly, in view of the above-described problems, a third object of the present invention is to provide a denitration system which can achieve an improvement in the efficiency of removal of nitrogen oxides present in exhaust gases as compared with the prior art.

DISCLOSURE OF THE INVENTION

The present inventors have carried out investigations with a view to accomplishing the above-described first and second objects, and have now found that, when an active carbon having a large specific surface area and high porosity (in particular, one obtained by heat-treating active carbon fibers or a granular active carbon having a large number of fine micropores with a size of 20 Å or less under specific conditions) is used as a catalyst for the denitration reaction of exhaust gas, a high degree of denitration can be achieved even at low temperatures of 150° C. or below. Moreover, they have also found that a high degree of denitration can be achieved even when exhaust gas having a low NO concentration is treated in the vicinity of ordinary temperature.

That is, the present invention provides the following techniques concerning the denitration of exhaust gas. Specifically, the present invention provides a process for producing an active carbon for use in the denitration of exhaust gas which comprises heat-treating a raw active carbon at 600 to 1,200° C. in a non-oxidizing atmosphere so as to remove oxygen-containing functional groups present at the surfaces thereof and thereby reduce the atomic surface oxygen/surface carbon ratio to 0.05 or less.

The present invention also provides a process for producing an active carbon for use in denitration which comprises heat-treating a raw active carbon at 600 to 1,200° C. in a non-oxidizing atmosphere and activating the surfaces thereof with sulfuric acid or nitric acid to impart oxidizing oxygen-containing functional groups thereto.

The present invention also provides a denitration method which comprises bringing exhaust gas containing nitrogen oxides and not more than 80% of water as water vapor, and $NH_3$ gas having the same concentration as the nitrogen oxides into contact with an active carbon for use in the denitration of exhaust gas that is produced by any of the above-described processes, at a temperature ranging from ordinary temperature to 150° C., in order to reduce the nitrogen oxides selectively and thereby decompose them to nitrogen and water.

The present invention also provides the denitration method wherein a higher degree of denitration of nitrogen oxides having a temperature of 20 to 150° C. and a concentration of 5 to 400 ppm is performed at the outlet of an exhaust gas treating apparatus or the outlet of a boiler.

In order to accomplish the above-described third object, a first denitration system using active carbon in accordance with the present invention comprises a first packed reactor which is packed with a heat-treated active carbon produced by heat-treating a raw active carbon at a temperature in the range of 600 to 1,000° C., and a second packed reactor which is located downstream thereof and packed with the heat-treated active carbon, whereby exhaust gas and ammonia ($NH_3$) are introduced into the first packed reactor so as to bring nitrogen oxides ($NO_x$) present in the exhaust gas into contact with the ammonia and remove the nitrogen oxides by the continuous selective reduction of them to nitrogen ($N_2$), and any excess ammonia is recovered by adsorption in the second packed reactor.

In the aforesaid denitration system, a gas to be treated can be alternately introduced into the first packed reactor and the second packed reactor so as to perform denitration and ammonia adsorption repeatedly.

In order to accomplish the above-described third object, a second denitration system using active carbon in accordance with the present invention comprises a denitrator packed with a heat-treated active carbon which is produced by heat-treating a raw active carbon at a temperature in the range of 600 to 1,000° C., and first and second ammonia adsorbers located before and behind the denitrator, respectively, whereby exhaust gas containing nitrogen oxides is alternately introduced through any one of the first and second ammonia adsorbers, ammonia ($NH_3$) is introduced at a position between the first or second ammonia adsorber and the denitrator, nitrogen oxides ($NO_x$) present in the exhaust gas are brought into contact with the heat-treated active carbon placed in the denitrator and removed by the continuous selective reduction of them to nitrogen ($N_2$), and any excess ammonia is recovered by adsorption in the adsorber located downstream of the denitrator.

In the aforesaid denitration systems, the raw active carbon may comprise raw active carbon fibers or a raw granular active carbon. The raw active carbon fibers preferably comprise carbon fibers derived from polyacrylonitrile or pitch.

Moreover, in the aforesaid denitration systems, there may be used an active carbon produced by subjecting the raw active carbon to a chemical treatment such as sulfuric acid treatment or metal carrying treatment, in place of the heat treatment.

The heat-treated active carbon of the present invention is highly effective as a catalyst for the denitration of exhaust gas. More specifically, when the heat-treated active carbon of the present invention is used for purposes of denitration, exhaust gases containing nitrogen oxides at low to high concentrations (about 20 to 500 ppm) can be denitrated at a low temperature ranging from ordinary temperature to about 150° C. and with a high degree of denitration of about 40 to 80%.

Especially when active carbon fibers derived from pitch are used, excellent denitration performance can be achieved even under a high partial pressure of water vapor.

Moreover, when the heat-treated active carbon of the present invention is used, gases containing nitrogen oxides at a low concentration of 15 ppm or less can be denitrated at a low temperature ranging from ordinary temperature to about 50° C. and with a high degree of denitration of about 40 to 80%, without oxidizing NO to $NO_2$ by means of ozone, electron rays or the like, or without concentrating nitrogen oxides by means of an adsorbent. Especially when active carbon fibers derived from pitch are used, excellent denitration performance can be achieved even under a high partial pressure of water vapor.

In the denitration systems of the present invention wherein the treatment of gases containing nitrogen oxides is performed by using an active carbon heat-treated under specific conditions as an ammonia adsorbent, low-concentration nitrogen oxides ($NO_x$) can be treated and, therefore, a higher degree of denitration can be achieved.

BRIEF DESCRIPTION OF THE DRAWINGS

FIG. 3 is a schematic illustration of a second embodiment of the denitration system in accordance with the present invention;

BEST MODE FOR CARRYING OUT THE INVENTION

Figure 1:
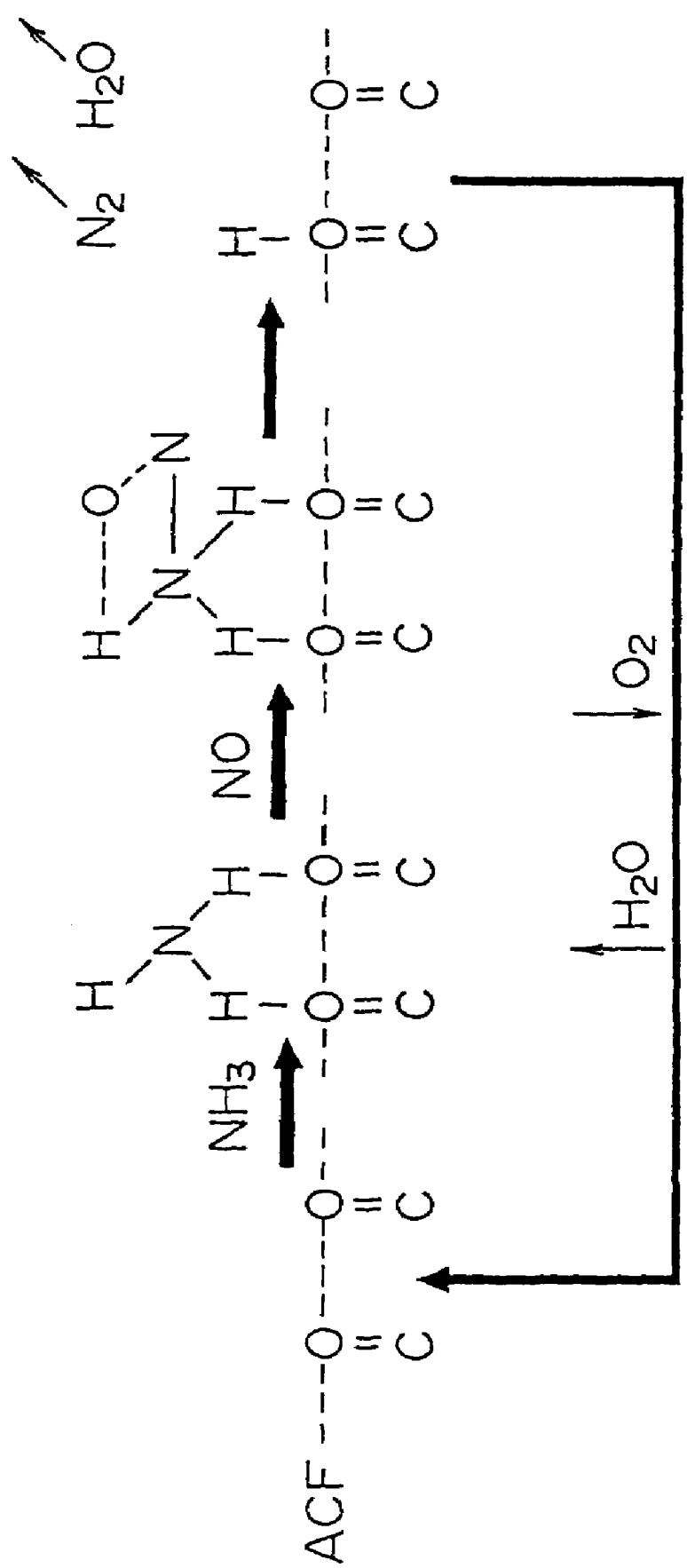
FIG. 1 is a schematic diagram showing the denitration reaction mechanism at the surfaces of an active carbon modified by the process of the present invention.

In this specification, all percentages are by volume unless otherwise stated. The term "non-oxidizing atmosphere" comprehends both inert gas atmospheres and reducing atmospheres. The term "ordinary temperature" means temperatures in the range of about 5 to 40° C.

The raw active carbon fibers which can be used in the present invention to produce a heat-treated active carbon for use in denitration include various types of active carbon fibers such as those derived from pitch, PAN, phenol and cellulose. Among them, active carbon fibers derived from pitch have low nitrogen and oxygen contents and enhance the effect of removing oxygen-containing functional groups present at the surfaces thereof by a heat treatment which will be described later. Accordingly, they exhibit high nitrogen oxide-removing activity even under a high partial pressure of water vapor. Thus, it is preferable to use active carbon fibers derived from pitch. Although no particular limitation is placed on the properties of the raw active carbon fibers, they usually have a pore diameter of about 10 to 30 Å, a pore volume of about 0.3 to 1.2 ml/g, and a specific surface area of about 500 to 2,000 m²/g.

In the present invention, a heat-treated active carbon which has high catalytic activity for denitration and minimizes the influence of moisture in exhaust gas (hereinafter also referred to as heat-treated active carbon A) can be obtained by heat-treating the raw active carbon at 600 to 1,200° C. in a non-oxidizing atmosphere such as nitrogen gas, argon gas or helium gas to remove oxygen-containing functional groups (such as COOH and COH) present at the surfaces of the raw active carbon and thereby reduce the atomic oxygen/carbon ratio of the surfaces to 0.05 or less.

Alternatively, a heat-treated active carbon having high catalytic activity for denitration can also be obtained by heat-treating the raw active carbon at 600 to 1,200° C. in a non-oxidizing atmosphere such as nitrogen gas, argon gas or helium gas, and then activating the surfaces thereof with sulfuric acid or nitric acid to impart thereto oxidizing oxygen-containing functional groups such as C=O and $C_2O$. In this case, the activation of the active carbon with sulfuric acid or nitric acid can be performed by adding sulfuric acid (about 98%) or nitric acid (about 60%) to the raw active carbon in an amount equal to three to five times the weight of the raw active carbon, soaking it fully, and heating it at about 350 to 500° C. until the sulfuric acid or nitric acid is evaporated completely. In this case, there can be obtained a heat-treated active carbon for use in denitration which exhibits very high denitrating activity even at low temperatures of 150° C. or below and minimizes the influence of moisture in exhaust gas (hereinafter also referred to as heat-treated active carbon B).

When the denitration of exhaust gas is performed according to the method of the present invention, exhaust gas containing nitrogen oxides at a low to high concentration (about 500 ppm or less), 3% or more of oxygen, and 0 to 80% of moisture as water vapor is brought into contact with $NH_3$ gas having the same concentration (or equivalent amount) as the nitrogen oxides, in the presence of the aforesaid heat-treated active carbon, at a temperature ranging from ordinary temperature (about 5 to 20° C.) to about 150° C. (more preferably in the range of about 100 to 150° C.). Thus, the nitrogen oxides are selectively reduced and thereby decomposed to nitrogen and water.

Generally, when the temperature of the exhaust gas is relatively low (i.e., 100° C. or below), it is preferable to use the aforesaid heat-treated active carbon A, and when the temperature of the exhaust gas is relatively high (i.e., 100° C. or above), it is preferable to use the aforesaid heat-treated active carbon B. Especially when heat-treated active carbon B is used, denitration can be performed even for exhaust gas having a moisture content of greater than 80%.

In the present invention, while the exhaust gas comes into contact with the heat-treated active carbon or passes through the heat-treated active carbon, nitrogen oxides ($NO_x$) present therein react with ammonia ($NH_3$) used as a reducing agent, as represented by the following equations, and thereby decomposed to harmless nitrogen ($N_2$) and water vapor ($H_2O$).

$$4NO + 4NH_3 + O_2 \rightarrow 4N_2 + 6H_2O \tag{1}$$

$$6NO_2 + 8NH_3 \rightarrow 7N_2 + 12H_2O \tag{2}$$

The reaction mechanism (at temperatures higher than 100° C.) at the surfaces of the heat-treated active carbon, which is represented by equation (1), is shown in FIG. 1.

First of all, ammonia is adsorbed to oxidizing oxygen-containing functional groups present at the surfaces of the heat-treated active carbon, so that active species such as OH (ad.) and $NH_2$ (ad.) are formed. Then, $NH_2$ (ad.) reacts with NO and thereby reduced to $N_2$ and $H_2O$. After $N_2$ and $H_2O$ are eliminated, the remaining —OH groups are oxidized by oxygen to regenerate oxidizing oxygen-containing functional groups.

The reason why these reactions proceed even at ordinary temperature is that the heat-treated active carbon has micropores with a size of 20 Å or less, and the reactants condense in the micropores and create high-pressure reactions in microscopic regions.

Usually, the above-described reactions are markedly inhibited by moisture present in the exhaust gas. This is due to the competitive adsorption of water and $O_2$ or $NH_3$. In the present invention, however, the raw active carbon is heat-treated in a non-oxidizing atmosphere to remove hydrophilic oxygen-containing groups and thereby minimize the influence of moisture in exhaust gas. Thus, a high degree of denitration can be achieved even at high humidity. Moreover, only oxidizing oxygen-containing functional groups such as C=O can be introduced by heat-treating the raw active carbon in a non-oxidizing atmosphere and then activating it with sulfuric acid or nitric acid. Thus, a high degree of denitration can be achieved even at low temperatures ranging from ordinary temperature to about 150° C., without any reduction in adsorption performance.

EXAMPLES

The features of the present invention are more clearly is explained with reference to the following examples and comparative examples. However, these examples are not to be construed to limit the scope of the present invention.

Examples 1-9

Heat-treated active carbon fibers in accordance with the present invention were produced by heat-treating the following three types of pitch-derived raw active carbon fibers (all manufactured by Osaka Gas Co., Ltd.) at 600-1,200° C. in an atmosphere of nitrogen for one hour.
OG-5A; specific surface area, 500 $m^2/g$
OG-10A; specific surface area, 1,000 $m^2/g$
OG-20A; specific surface area, 2,000 $m^2/g$ 2 g each of the heat-treated active carbon fibers obtained as above were separately packed in tubular reactors (25 mm in inner diameter), and a nitrogen oxide-containing gas was passed therethrough at a temperature of 150° C. and a flow rate of 400 cc/min. The nitrogen oxide-containing gas was composed of 150 ppm NO, 150 ppm $NH_3$, 15% $O_2$ and the balance $N_2$, and its moisture content was 80% as expressed in terms of the partial pressure of water vapor.

The effluent gas from each reactor was analyzed with a chemoluminescence type $NO_x$ meter (ECL-88US; manufactured by Yanagimoto Seisakusho), and the degree of denitration was calculated according to the following equation.

Degree of denitration (%)=[Inlet NO concentration (ppm)−Outlet NO concentration (ppm)]÷Inlet NO concentration (ppm)×100

The steady-state values obtained in a stabilized state 30 hours after the start of the reaction are shown in Table 1.

The atomic oxygen/carbon ratio at the surfaces of the active carbon fibers (hereinafter referred to as O/C) was measured with a photoelectron spectroscopic analyzer ("ESCA850"; manufactured by Shimadzu Corp.).

Comparative Examples 1-3

Instead of being heat-treated, the three types of pitch-derived raw active carbon fibers used in Examples 1-9 were directly packed in tubular reactors similar to those used in Examples 1-9, and subjected to denitration reaction in the same manner as in Examples 1-9. The results thus obtained are also shown in Table 1.

TABLE 1

|  | Type of sample | Heat-treating temperature (° C.) | Degree of denitration (%) | O/C |
|---|---|---|---|---|
| Comparative Example 1 | OG-5A | — | 2 | 0.122 |
| Example 1 | OG-5A | 600 | 20 | 0.047 |
| Example 2 | OG-5A | 800 | 33 | 0.033 |
| Example 3 | OG-5A | 1,000 | 26 | 0.025 |
| Comparative Example 2 | OG-10A | — | 3 | 0.096 |
| Example 4 | OG-10A | 600 | 22 | 0.050 |
| Example 5 | OG-10A | 800 | 28 | 0.044 |
| Example 6 | OG-10A | 1,000 | 25 | 0.023 |

TABLE 1-continued

|  | Type of sample | Heat-treating temperature (° C.) | Degree of denitration (%) | O/C |
|---|---|---|---|---|
| Comparative Example 3 | OG-20A | — | 2 | 0.080 |
| Example 7 | OG-20A | 600 | 18 | 0.045 |
| Example 8 | OG-20A | 800 | 24 | 0.035 |
| Example 9 | OG-20A | 1,000 | 20 | 0.025 |

It is evident from the results shown in Table 1 that the heat-treated active carbon fibers exhibit an excellent denitrating effect.

Examples 10-18

The same three types of pitch-derived raw active carbon fibers as used in Examples 1-9 were heat-treated at 600-1,200° C. in an atmosphere of nitrogen for one hour, and then activated by adding sulfuric acid (98%) to the carbon fibers in an amount equal to three times the weight of the carbon fibers, soaking them fully in the sulfuric acid, and heating them at 400° C. until the sulfuric acid was evaporated completely.

2 g each of the heat-treated carbon fibers obtained as above were packed in tubular reactors in the same manner as in Examples 1-9, and subjected to denitration reaction in the same manner as in Examples 1-9. The results thus obtained are shown in Table 2.

TABLE 2

|  | Type of sample | Heat-treating temperature (° C.) | Activation with sulfuric acid (° C.) | Degree of denitration (%) | O/C |
|---|---|---|---|---|---|
| Example 10 | OG-5A | 600 | 400 | 40 | 0.054 |
| Example 11 | OG-5A | 800 | 400 | 75 | 0.048 |
| Example 12 | OG-5A | 1,000 | 400 | 50 | 0.040 |
| Example 13 | OG-10A | 600 | 400 | 32 | 0.055 |
| Example 14 | OG-10A | 800 | 400 | 55 | 0.048 |
| Example 15 | OG-10A | 900 | 400 | 46 | 0.039 |
| Example 16 | OG-20A | 600 | 400 | 36 | 0.052 |
| Example 17 | OG-20A | 800 | 400 | 48 | 0.040 |
| Example 18 | OG-20A | 900 | 400 | 40 | 0.036 |

It is evident from the results shown in Table 2 that the active carbon fibers modified by heat treatment and activation with sulfuric acid exhibit a more excellent denitrating effect.

Examples 19-43

Heat-treated active carbon fibers in accordance with the present invention were produced by heat-treating the following four types of pitch-derived raw active carbon fibers (all manufactured by Osaka Gas Co., Ltd.) at 600-1,200° C. in an atmosphere of nitrogen for one hour.
OG-7A: specific surface area, 700 $m^2/g$
OG-8A; specific surface area, 800 $m^2/g$
OG-10A; specific surface area, 1,000 $m^2/g$
OG-20A; specific surface area, 2,000 $m^2/g$ 2 g each of the heat-treated active carbon fibers obtained as above were separately packed in tubular reactors (25 mm in inner diameter), and a gas containing nitrogen oxide at a low concentration was passed therethrough at a temperature of 25° C. and a flow rate of 400 cc/min. The nitrogen oxide-containing gas was composed of 10 ppm NO, 10 ppm $NH_3$, 15% $O_2$ and the balance $N_2$, and its moisture content was 0% or 80% as expressed in terms of relative humidity at 25° C.

The effluent gas from each reactor was analyzed with a chemoluminescence type $NO_x$ meter (ECL-88US; manufactured by Yanagimoto Seisakusho), and the degree of denitration was calculated according to the following equation.

Degree of denitration (%)=[Inlet NO concentration (ppm)−Outlet NO concentration (ppm)]÷Inlet NO concentration (ppm)×100

The steady-state values obtained in a stabilized state 30 hours after the start of the reaction are shown in Tables 3 to 6.

The atomic oxygen/carbon ratio at the surfaces of the active carbon fibers was measured with a photoelectron spectroscopic analyzer ("ESCA850"; manufactured by Shimadzu Corp.).

Comparative Examples 4-11

Instead of being heat-treated, the four types of pitch-derived raw active carbon fibers used in Examples 19-43 were directly packed in tubular reactors similar to those used in Examples 19-43, and subjected to denitration reaction in the same manner as in Examples 19-43. The results thus obtained are also shown in Tables 3 to 6.

TABLE 3

| | Type of sample | Heat-treating temperature (° C.) | Degree of denitration (%) | Surface oxygen/carbon |
|---|---|---|---|---|
| Relative humidity during reaction: 0% | | | | |
| Comparative Example 4 | OG-7A | — | 60 | 0.122 |
| Example 19 | OG-7A | 600 | 65 | 0.047 |
| Example 20 | OG-7A | 700 | 66 | 0.042 |
| Example 21 | OG-7A | 800 | 70 | 0.033 |
| Example 22 | OG-7A | 850 | 74 | 0.030 |
| Relative humidity during reaction: 80% | | | | |
| Comparative Example 5 | OG-7A | — | 8 | 0.122 |
| Example 23 | OG-7A | 600 | 14 | 0.047 |
| Example 24 | OG-7A | 700 | 20 | 0.042 |
| Example 25 | OG-7A | 800 | 30 | 0.033 |
| Example 26 | OG-7A | 850 | 39 | 0.030 |

TABLE 4

| | Type of sample | Heat-treating temperature (° C.) | Degree of denitration (%) | Surface oxygen/carbon |
|---|---|---|---|---|
| Relative humidity during reaction: 0% | | | | |
| Comparative Example 6 | OG-8A | — | 58 | 0.115 |
| Example 27 | OG-8A | 600 | 65 | 0.044 |
| Example 28 | OG-8A | 700 | 66 | 0.039 |
| Example 29 | OG-8A | 800 | 72 | 0.030 |
| Example 30 | OG-8A | 855 | 75 | 0.027 |
| Relative humidity during reaction: 80% | | | | |
| Comparative Example 7 | OG-8A | — | 22 | 0.115 |
| Example 31 | OG-8A | 600 | 30 | 0.044 |
| Example 32 | OG-8A | 700 | 33 | 0.029 |
| Example 33 | OG-8A | 800 | 42 | 0.030 |
| Example 34 | OG-8A | 850 | 46 | 0.027 |

TABLE 5

| | Type of sample | Heat-treating temperature (° C.) | Degree of denitration (%) | Surface oxygen/carbon |
|---|---|---|---|---|
| Relative humidity during reaction: 0% | | | | |
| Comparative Example 8 | OG-10A | — | 48 | 0.096 |
| Example 35 | OG-10A | 600 | 64 | 0.050 |
| Example 36 | OG-10A | 850 | 42 | 0.043 |
| Relative humidity during reaction: 80% | | | | |
| Comparative Example 9 | OG-10A | — | 9 | 0.096 |
| Example 37 | OG-10A | 600 | 18 | 0.050 |
| Example 38 | OG-10A | 850 | 24 | 0.043 |
| Example 39 | OG-10A | 900 | 20 | 0.035 |

TABLE 6

| | Type of sample | Heat-treating temperature (° C.) | Degree of denitration (%) | Surface oxygen/carbon |
|---|---|---|---|---|
| Relative humidity during reaction: 0% | | | | |
| Comparative Example 10 | OG-20A | — | 42 | 0.080 |
| Example 40 | OG-20A | 600 | 50 | 0.045 |
| Example 41 | OG-20A | 850 | 38 | 0.035 |
| Relative humidity during reaction: 80% | | | | |
| Comparative Example 11 | OG-20A | — | 6 | 0.080 |
| Example 42 | OG-20A | 600 | 15 | 0.045 |
| Example 43 | OG-20A | 850 | 16 | 0.035 |

It is evident from the results shown in Tables 3 to 6 that the active carbon fibers modified by heat treatment exhibit an excellent denitrating effect.

Examples 44-47

One type of phenol-derived active carbon fibers ["FE-300" (trade name); manufactured by Toho Rayon Co., Ltd.; specific surface area, 850 $m^2$/g] was heat-treated in the same manner as in Examples 19-43, and then used to treat a NO-containing gas. The results thus obtained are shown in Table 7.

Comparative Examples 12-13

Instead of being heat-treated, the two types of phenol-derived raw active carbon fibers used in Examples 44-47 were directly packed in tubular reactors similar to those used in Examples 44-47, and subjected to denitration reaction in the same manner as in Examples 44-47. The results thus obtained are also shown in Table 7.

TABLE 7

| | Type of sample | Heat-treating temperature (° C.) | Degree of denitration (%) | Surface oxygen/carbon |
|---|---|---|---|---|
| Relative humidity during reaction: 0% | | | | |
| Comparative Example 12 | FE-300 | — | 64 | 0.250 |
| Example 44 | FE-300 | 600 | 50 | 0.120 |
| Example 45 | FE-300 | 850 | 40 | 0.050 |

TABLE 7-continued

| Type of sample | Heat-treating temperature (° C.) | Degree of denitration (%) | Surface oxygen/ carbon |
|---|---|---|---|
| Relative humidity during reaction: 80% | | | |
| Comparative Example 13 FE-300 | — | 5 | 0.250 |
| Example 46 FE-300 | 600 | 14 | 0.120 |
| Example 47 FE-300 | 850 | 8 | 0.050 |

It is evident from the results shown in Table 7 that the heat-treated active carbon fibers derived from phenol exhibit an improved denitrating effect, especially under high-humidity conditions including a relative humidity of 80%.

Now, several embodiments of the denitration system in accordance with the present invention are explained in greater detail. However, it is to be understood that the present invention is not limited thereto.

First Embodiment of the Denitration System

Figure 2:
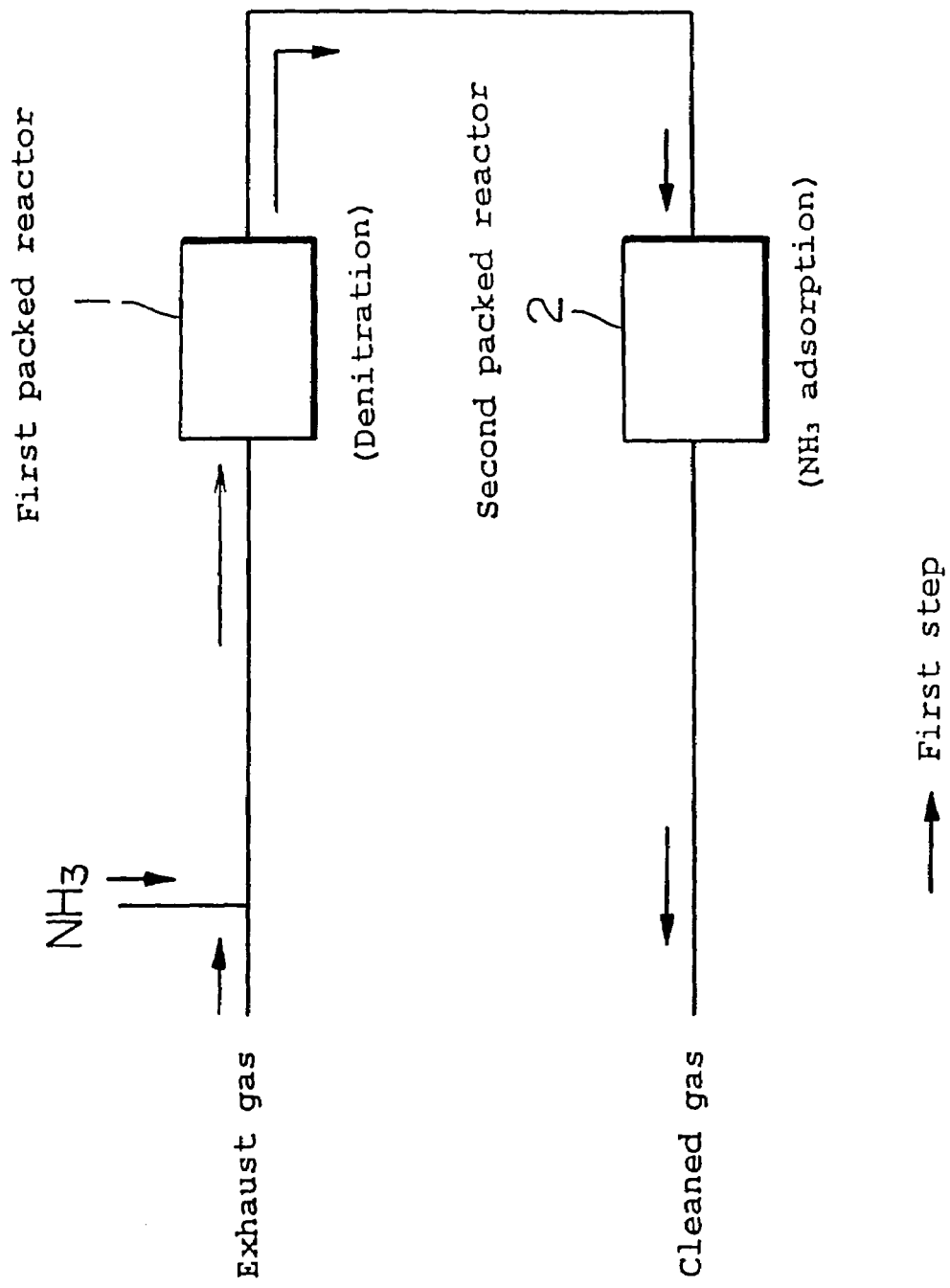
FIG. 2 is a schematic illustration of a first embodiment of the denitration system in accordance with the present invention.

FIG. 2 illustrates a first embodiment of the denitration system for practicing the present invention.

In FIG. 2, reference numerals 1 and 2 designate a first packed reactor and a second packed reactor, respectively.

As shown in this figure, the first and second packed reactors are packed with a heat-treated active carbon which has been produced by heat-treating a raw active carbon at a temperature in the range of 600 to 1,000° C.

A nitrogen oxide-containing gas to be treated, together with ammonia ($NH_3$), is introduced into first packed reactor 1 where nitrogen oxides ($NO_x$) present in the gas to be treated are brought into contact with the ammonia and removed by the continuous selective reduction of them to nitrogen ($N_2$). Moreover, in second packed reactor 2, any excess ammonia remaining after the reaction is recovered by adsorption.

As the heat-treated active carbon packed into the aforesaid first packed reactor 1 and second packed reactor 2, there is used one obtained by chemically treating pitch-derived carbon fibers (formed by the melt spinning of pitch obtained as residue in coal chemical and petrochemical processes) under the following conditions.

In this embodiment, the aforesaid pitch-derived active carbon fibers comprised pitch-derived active carbon fibers "OG-5A" (trade name) manufactured by Osaka Gas Co., Ltd. These active carbon fibers were fired at about 850° C. in a reducing atmosphere for one hour, shaped into a corrugated form, and then used in the embodiment.

Moreover, when polyacrylonitrile (PAN)-derived active carbon fibers obtained by firing and carbonizing high-molecular-weight polyacrylonitrile fibers ["FE-300" (trade name); manufactured by Toho Rayon Co., Ltd.] were used as the heat-treated active carbon, the concentration of nitrogen oxides ($NO_x$) in exhaust gas could also be reduced in the same manner as described above.

Furthermore, when a granular active carbon ["HC-30" (trade name); manufactured by Tsurumi Coal Co., Ltd.] heat-treated at 400-1,400° C. in an atmosphere of nitrogen for one hour was used as the heat-treated active carbon, the concentration of nitrogen oxides ($NO_x$) in exhaust gas could also be reduced in the same manner as described above.

Besides the aforesaid heat treatment, the denitration performance and ammonia adsorption performance of active carbon can be improved by subjecting it to any of the following chemical treatments.

Sulfuric Acid Treatment

This treatment comprises adding a raw active carbon to a mixture composed of 100 parts by weight of active carbon, 300 parts by weight of sulfuric acid, and 200 parts by weight of water, heating the resulting mixture at 60-70° C. to evaporate the water, and holding it at 400° C. (or 300-1,200° C.) in an inert gas ($N_2$) for 4 hours.

Metal Carrying Treatment

This treatment comprises adding a raw active carbon to a mixture composed of 100 parts by weight of active carbon, 10 parts by weight of iron nitrate, and 300 parts by weight of water, heating the resulting mixture at 60-70° C. to evaporate the water, and holding it at 400° C. (or 300-1,200° C.) in an inert gas ($N_2$) for 4 hours.

Copper nitrate, manganese nitrate, nickel nitrate, cobalt nitrate, zinc nitrate and the like may also be used in place of the aforesaid iron nitrate.

The active carbon which has been subjected to a chemical treatment such as the aforesaid sulfuric acid treatment or metal carrying treatment shows an improvement not only in denitration performance but also in ammonia adsorption performance, and can hence be applied to the denitration system in place of the aforesaid heat-treated active carbon. The active carbon which has been subjected to such a chemical treatment can also be used in other embodiments which will be described later.

Second Embodiment of the Denitration System

FIG. 3 illustrates a second embodiment of the denitration system in accordance with the present invention.

In FIG. 3, reference numeral 11 designates a first packed reactor; 12, a second packed reactor; 13 to 18, valves; and 19, an ammonia supply line.

As shown in FIG. 3, this denitration system is constructed so that a gas to be treated is alternately introduced into a first packed reactor 11 and a second packed reactor 12 which are packed with a heat-treated active carbon produced by heat-treating a raw active carbon at a temperature in the range of 600 to 1,000° C., whereby the gas is subjected to denitration reaction and any excess ammonia is recovered by adsorption.

In the first-step operation of this embodiment, as shown in FIG. 3(A), valves 13-15 are opened, valves 16-18 are closed, and an excess of ammonia ($NH_3$) is introduced through an ammonia supply line 19. Thus, in first packed reactor 11, nitrogen oxides ($NO_x$) present in the gas to be treated are brought into contact with the ammonia introduced together with the gas, and removed by the continuous selective reduction of them to nitrogen ($N_2$).

The gas from which nitrogen oxides have been removed is passed through valve 14 and introduced into second packed reactor 12 which is packed with the aforesaid heat-treated active carbon, where any excess ammonia is recovered by adsorption.

In the succeeding second-step operation, as shown in FIG. 3(B), valves 13-15 are closed, valves 16-18 are opened, and an excess of ammonia ($NH_3$) is introduced through ammonia supply line 19. Thus, in second packed reactor 12, nitrogen oxides ($NO_x$) present in the gas to be treated are brought into contact with the ammonia introduced together with the gas, and removed by the continuous selective reduction of them to nitrogen ($N_2$).

During this process, the excess ammonia adsorbed in second packed reactor 12 during the aforesaid first-step operation is also used for purposes of reduction, so that second packed reactor 12 is regenerated.

The gas from which nitrogen oxides have been removed is passed through valve 17 and introduced into first packed reactor 11, where any excess ammonia is recovered by adsorption.

Thus, nitrogen oxides can be continuously and efficiently treated by introducing a gas to be treated alternately into first packed reactor 11 and second packed reactor 12 so as to perform denitration and ammonia adsorption repeatedly.

Third Embodiment of the Denitration System

Figure 4:
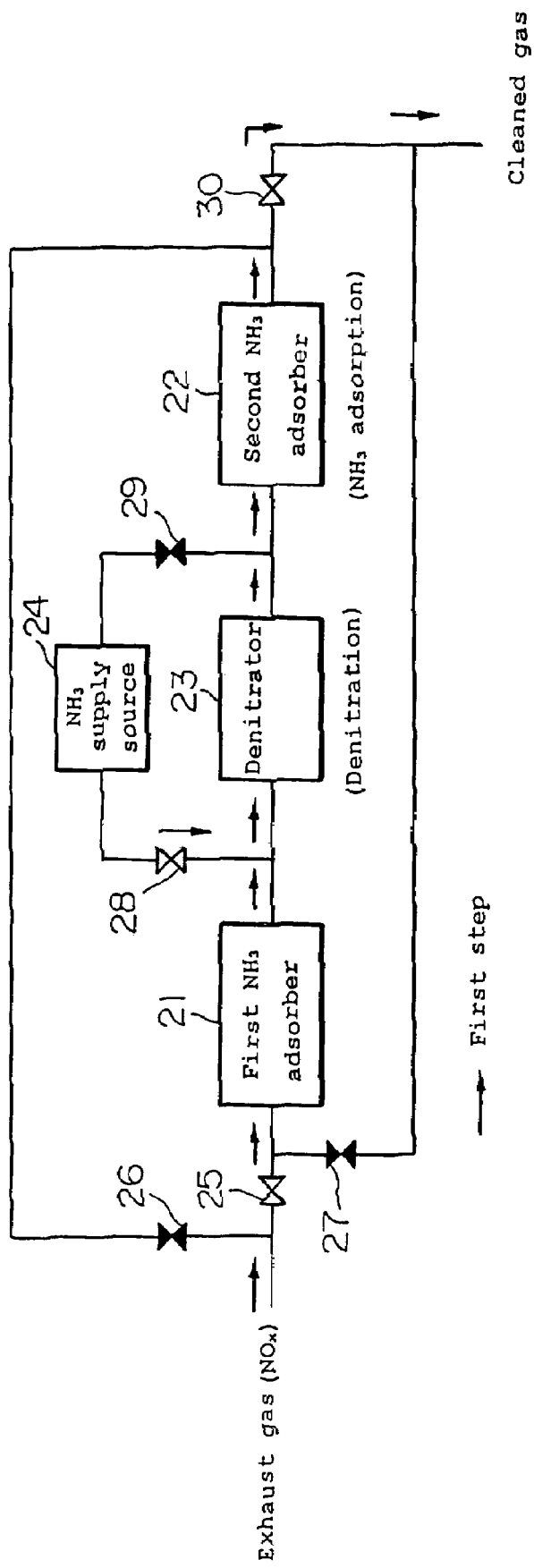
FIG. 4 is a schematic illustration of a third embodiment of the denitration system in accordance with the present invention.
Figure 5:
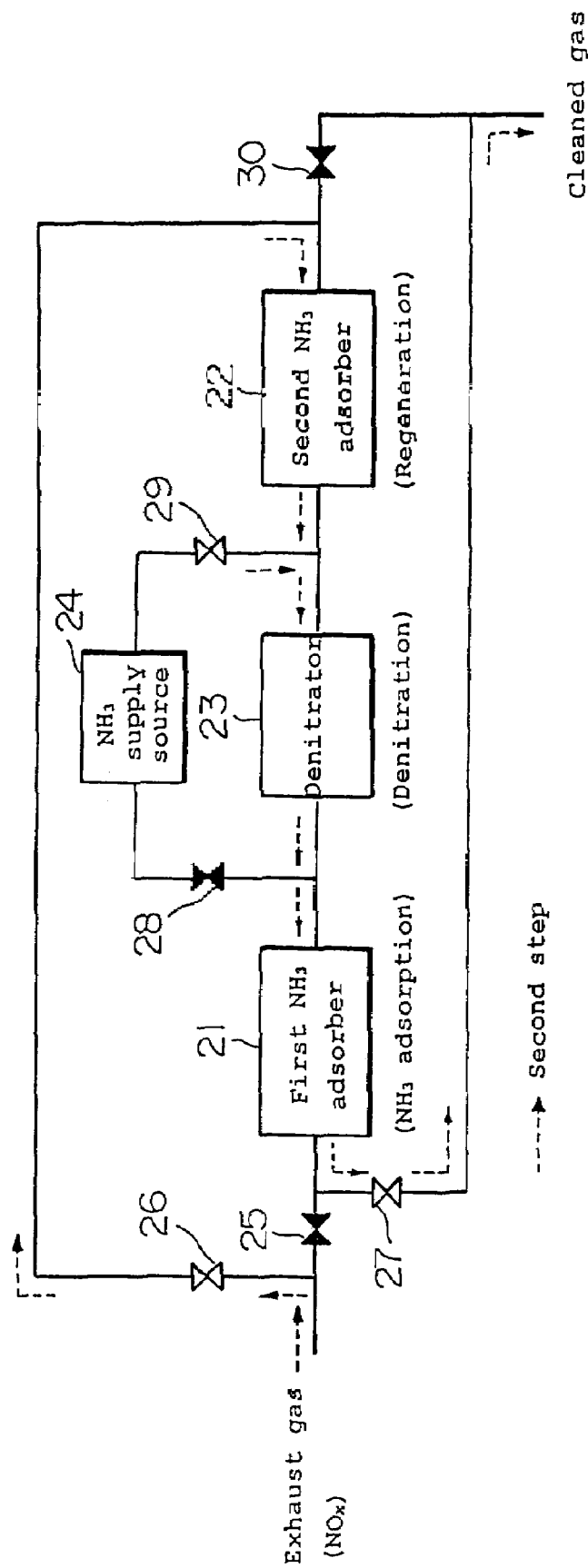
FIG. 5 is a schematic illustration of the third embodiment of the denitration system in accordance with the present invention.
Figure 6:
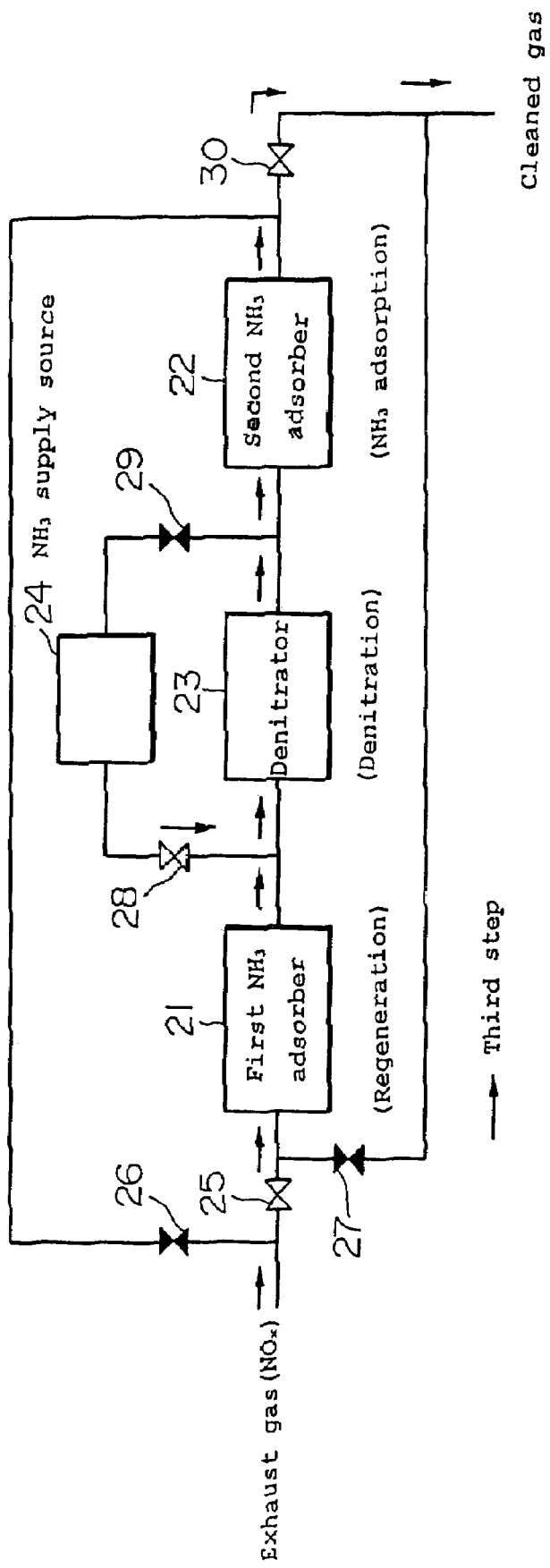
FIG. 6 is a schematic illustration of the third embodiment of the denitration system in accordance with the present invention.
Figure 7:
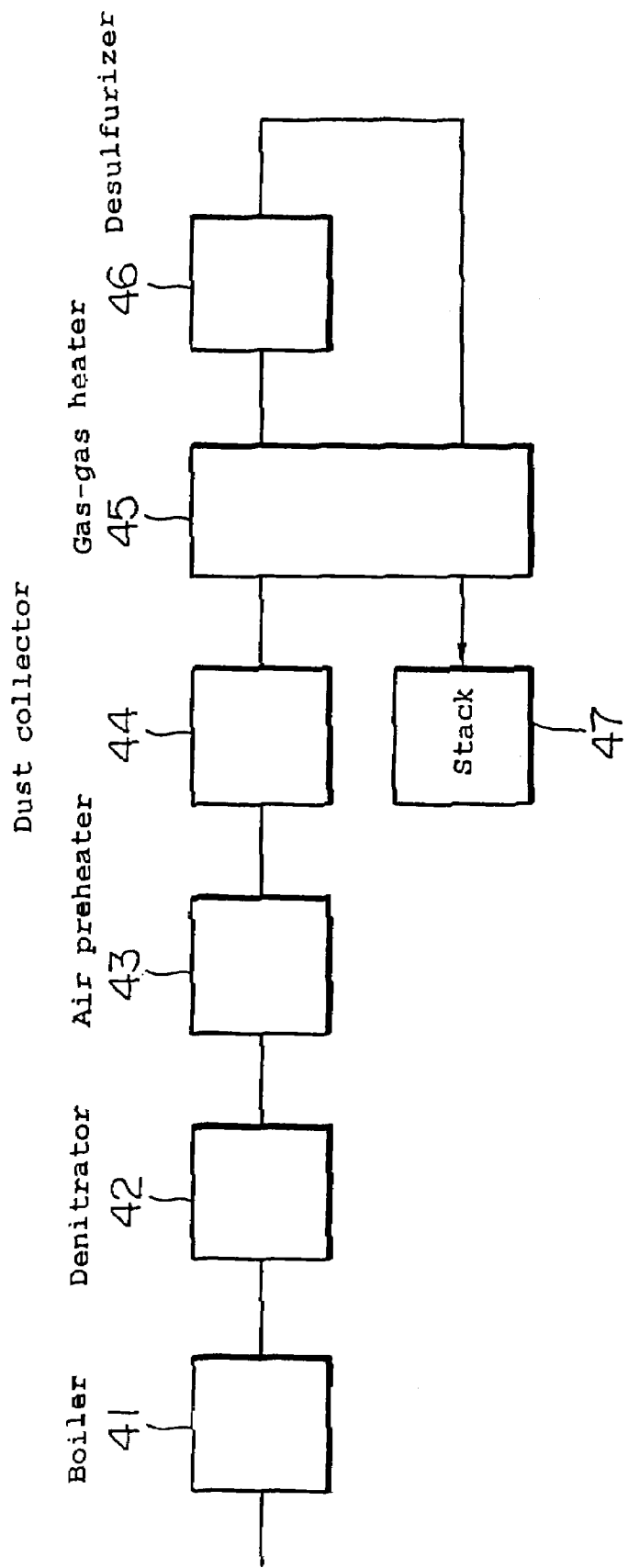
FIG. 7 is a schematic illustration of a conventional denitration system.

FIGS. 4 to 6 illustrate a third embodiment of the denitration system in accordance with the present invention.

In FIGS. 4 to 6, reference numeral 21 designates a first ammonia adsorber; 22, a second ammonia adsorber; 23, a denitrator; 24, an ammonia supply source; and 25 to 30, valves.

As shown in FIGS. 4 to 6, this denitration system includes a first ammonia adsorber 21 and a second ammonia adsorber 22 which are packed with a heat-treated active carbon produced by heat-treating a raw active carbon at a temperature in the range of 600 to 1,000° C., and a denitrator 23 located therebetween and packed with a heat-treated active carbon produced by heat-treating a raw active carbon at a temperature in the range of 600 to 1,000° C. Exhaust gas is alternately introduced from the sides of first ammonia adsorber 21 and second ammonia adsorber 22, whereby the gas is subjected to denitration reaction and any excess ammonia is recovered by adsorption.

In the first-step operation of this embodiment, as shown in FIG. 4, valves 25, 28 and 30 are opened, valves 26, 27 and 29 are closed, and an excess of ammonia ($NH_3$) is introduced from an ammonia supply source 24 into denitrator 23 by way of valve 28. Thus, in denitrator 23, nitrogen oxides ($NO_x$) present in the exhaust gas are brought into contact with the ammonia introduced together with the exhaust gas, and removed by the continuous selective reduction of them to nitrogen ($N_2$).

The exhaust gas from which nitrogen oxides have been removed is introduced into second ammonia adsorber 22 located on the downstream side, where any excess ammonia is recovered by adsorption. Thereafter, the cleaned gas is discharged through valve 30.

In the succeeding second-step operation, as shown in FIG. 5, valves 25, 28 and 30 are closed, valves 26, 27 and 29 are opened, and an excess of ammonia ($NH_3$) is introduced from ammonia supply source 24 into denitrator 23 by way of valve 29. Thus, in denitrator 23, nitrogen oxides ($NO_x$) present in the gas to be treated are brought into contact with the ammonia introduced together with the gas, and removed by the continuous selective reduction of them to nitrogen ($N_2$).

During this process, the excess ammonia adsorbed in second ammonia adsorber 22 during the aforesaid first-step operation is also used for purposes of reduction, so that second ammonia adsorber 22 is regenerated.

The exhaust gas from which nitrogen oxides have been removed is introduced into first ammonia adsorber 21 located on the downstream side, where any excess ammonia is recovered by adsorption. Thereafter, the cleaned gas is discharged through valve 27.

In the succeeding third-step operation, as shown in FIG. 6, valves 25, 28 and 30 are opened, valves 26, 27 and 29 are closed, and an excess of ammonia ($NH_3$) is introduced from ammonia supply source 24 into denitrator 23 by way of valve 28, similarly to the first-step operation. Thus, in denitrator 23, nitrogen oxides ($NO_x$) present in the gas to be treated are brought into contact with the ammonia introduced together with the gas, and removed by the continuous selective reduction of them to nitrogen ($N_2$).

During this process, the excess ammonia adsorbed in first ammonia adsorber 21 during the aforesaid second-step operation is also used for purposes of reduction, so that first ammonia adsorber 21 is regenerated.

The exhaust gas from which nitrogen oxides have been removed is introduced into second ammonia adsorber 22 located on the downstream side, where any excess ammonia is recovered by adsorption. Thereafter, the cleaned gas is discharged through valve 30.

Thus, nitrogen oxides can be continuously and efficiently treated by introducing exhaust gas alternately into first ammonia adsorber 21 and second ammonia adsorber 22 so as to perform denitration and ammonia adsorption repeatedly and, moreover, regenerate the ammonia adsorbers.

The treatment of exhaust gases discharged from boilers, gas turbines, engines and combustion furnaces for burning various types of fuel is facilitated by applying the aforesaid denitration systems to the removal of nitrogen oxides ($NO_x$) present therein.

Moreover, the present invention can also be suitably used for the removal of nitrogen oxides present in tunnels and for the removal of nitrogen oxides present in exhaust gases from nitric acid production plants.

The invention claimed is:

1. A denitration method comprising
contacting a gas containing one or more nitrogen oxides with a heat treated carbon, wherein said contacting results in reducing a concentration of the nitrogen oxides in the gas, wherein the heat-treated carbon has an atomic surface oxygen/surface carbon ratio of 0.05 or less.

2. The denitration method of claim 1, wherein the heat treated carbon is prepared by heat-treating an active carbon at 600 to 1200° C. in a non oxidizing atmosphere.

3. The denitration method of claim 2, wherein a temperature of the gas is 100° C. or below.

4. The denitration method of claim 1, wherein the heat-treated carbon was prepared by heat-treating an active carbon at 600 to 1200° C. in a non-oxidizing atmosphere and activating a surface of the carbon with sulfuric or nitric acid.

5. The denitration method of claim 4, wherein a temperature of the gas ranges from 100 to 150° C.

6. The denitration method of claim 1, wherein one or more nitrogen oxides comprises NO.

7. The denitration method of claim 1, wherein:
a) prior to the contacting, the gas contains from about 20 to 500 ppm of the one or more nitrogen oxides;
b) a temperature of the gas is from 5° C. to about 150° C. during the contacting; and
c) said contacting results in reducing the concentration of the nitrogen oxides in the gas by about 40 to 80%.

8. The denitration method of claim 1, wherein:
a) prior to the contacting, the gas contains 15 ppm or less of the one or more nitrogen oxides;
b) a temperature of the gas is from 5° C. up to about 150° C. during the contacting; and
c) said contacting results in reducing the concentration of the nitrogen oxides in the gas by about 40 to 80%.

9. The denitration method of claim 8, wherein said reducing is achieved without oxidizing NO to $NO_2$.

10. The denitration method of claim 8, wherein said reducing is achieved without concentrating said nitrogen oxides.

11. The denitration method of claim 1, wherein the gas contains up to 80% of moisture as water vapor.

12. The denitration method of claim 1, wherein the gas contains greater than 80% of moisture as water vapor.

13. The denitration method of claim 1, wherein the heat treated carbon is prepared from an active carbon fiber derived from polyacrylonitrile or pitch.

14. The denitration method of claim 1, wherein said gas is an exhaust gas.

15. The denitration method of claim 1, wherein said gas is a ventilation gas produced in a road tunnel or an underground parking space.

16. The denitration method of claim 1, wherein said gas has a temperature of 150° C. or below.

17. The denitration method of claim 1, wherein said contacting results in decomposing the one or more nitrogen oxides into water and nitrogen.

18. The denitration method of claim 1, wherein said contacting is performed in a presence of $NH_3$.

19. A denitration method comprising contacting a gas containing one or more nitrogen oxides with a heat treated carbon, wherein said contacting results in reducing a concentration of the nitrogen oxides in the gas, wherein the heat-treated carbon was prepared by heat-treating an active carbon at 600 to 1200° C. in a non-oxidizing atmosphere and activating a surface of the carbon with sulfuric or nitric acid.

20. The denitration method of claim 19, wherein a temperature of the gas ranges from 100° C. to 150° C.

21. The denitration method of claim 19, wherein one or more nitrogen oxides comprises NO.

22. The denitration method of claim 19, wherein:
  a) prior to the contacting, the gas contains from about 20 to 500 ppm of the one or more nitrogen oxides;
  b) a temperature of the gas is from 5° C. to about 150° C. during the contacting; and
  c) said contacting results in reducing the concentration of the nitrogen oxides in the gas by 40 to 80%.

23. The denitration method of claim 19, wherein:
  a) prior to the contacting, the gas contains 15 ppm or less of the one or more nitrogen oxides;
  b) a temperature of the gas is from 5° C. up to about 150° C. during the contacting; and
  c) said contacting results in reducing the concentration of the nitrogen oxides in the gas by about 40 to 80%.

24. The denitration method of claim 23, wherein said reducing is achieved without oxidizing NO to $NO_2$.

25. The denitration method of claim 23, wherein said reducing is achieved without concentrating said nitrogen oxides.

26. The denitration method of claim 19, wherein the gas contains up to 80% of moisture as water vapor.

27. The denitration method of claim 19, wherein the gas contains greater than 80% of moisture as water vapor.

28. The denitration method of claim 19, wherein the heat treated carbon is prepared from an active carbon fiber derived from polyacrylonitrile or pitch.

29. The denitration method of claim 19, wherein said gas is an exhaust gas.

30. The denitration method of claim 19, wherein said gas is a ventilation gas produced in a road tunnel or an underground parking space.

31. The denitration method of claim 19, wherein said gas has a temperature of 150° C. or below.

32. The denitration method of claim 19, wherein said contacting results in decomposing the one or more nitrogen oxides into water and nitrogen.

33. The denitration method of claim 19, wherein said contacting is performed in a presence of $NH_3$.

* * * * *